United States Patent [19]

Salecker et al.

[11] Patent Number: 5,957,805

[45] Date of Patent: Sep. 28, 1999

[54] MOTOR VEHICLE

[75] Inventors: Michael Salecker; Klaus Küpper; Martin Vornehm, all of Bühl; Franz Kosik, Ostfildern; Thomas Grass, Urbach, all of Germany

[73] Assignees: LuK Getriebe-Systeme GmbH, Buhl/Baden, Germany; Daimler-Benz Aktiengesellschaft, Stuttgart, Germany

[21] Appl. No.: 08/983,277

[22] PCT Filed: May 9, 1997

[86] PCT No.: PCT/DE97/00969

§ 371 Date: May 26, 1998

§ 102(e) Date: May 26, 1998

[87] PCT Pub. No.: WO97/43566

PCT Pub. Date: Nov. 20, 1997

[30] Foreign Application Priority Data

May 11, 1996 [DE] Germany .......................... 196 19 163

[51] Int. Cl.⁶ .................................................. B60K 23/00
[52] U.S. Cl. .............................................................. 477/74
[58] Field of Search ................................................ 477/74

[56] References Cited

U.S. PATENT DOCUMENTS

| | | | |
|---|---|---|---|
| 4,363,389 | 12/1982 | Zaunberger et al. | 477/74 |
| 4,618,042 | 10/1986 | Yamamoto | 477/74 |
| 4,643,048 | 2/1987 | Hattori et al. | 477/74 |
| 4,653,352 | 3/1987 | Nakao et al. | 477/74 |
| 4,778,038 | 10/1988 | Ohkawa et al. | 477/74 |
| 5,377,797 | 1/1995 | Mustapha et al. | |

FOREIGN PATENT DOCUMENTS

| | | |
|---|---|---|
| 0 350 812 | 1/1990 | European Pat. Off. . |
| 02070538 | 3/1990 | European Pat. Off. . |
| 0 423 799 | 4/1991 | European Pat. Off. . |
| 1 755 528 | 10/1970 | Germany . |
| 26 45 145 | 4/1977 | Germany . |
| 43 41 729 A1 | 6/1994 | Germany . |
| 2 058 963 | 4/1981 | United Kingdom . |
| WO 89/00517 | 1/1989 | WIPO . |
| WO 96/20363 | 7/1996 | WIPO . |

*Primary Examiner*—Dirk Wright
*Attorney, Agent, or Firm*—Darby & Darby

[57] ABSTRACT

A motor vehicle wherein the power train comprises an automated clutch between the engine and a manually shiftable transmission. The control circuit for the clutch is designed in such a way that the clutch is disengaged in response to actuation of the gear shifting lever simultaneously with one or more additional undertakings such as actuation of the gas pedal and of one or more brakes, a reduction of the speed of the vehicle below a preselected value, and/or many others.

20 Claims, 2 Drawing Sheets

MOTOR VEHICLE

BACKGROUND OF THE INVENTION

The invention relates to a motor vehicle with a driving unit, such as for example a motor or a combustion engine, a transmission and an automated torque transmitting system such as for example a clutch, a friction clutch or a magnetic powder clutch, the transmission ratio being selectable by a servicing element such as for example a shifting lever, a sensor arrangement detecting the actuation of the servicing element and a control unit being adapted to generate a control signal in response to which the torque transmitting system is disengaged in the event of an actuation of the servicing element.

It is known from DE 17 55 528 that, in such motor vehicles with automated torque transmitting systems, a shifting operation by actuation of the servicing element is possible only when the throttle valve is not actuated.

In technical systems, such as in the aforediscussed motor vehicles, even minor irregularities or defects can grow to proportions which are critical from the standpoint of operability of safety and which cannot be accepted for reasons of operability or safety.

In a motor vehicle which embodies an automated torque transmitting system which permits a shifting of the transmission only when the gas pedal is not actuated, i.e., in the event of actuation of an idling switch which detects whether or not the gas pedal assumes its idle position, a situation which is critical from the operational or safety standpoint can arise, for example, in the event of the development of a defect in the region of connection between the gas pedal and the engine, for example in that the gas pedal jams and such defect does not permit a resetting of the gas pedal and actuation of the idling switch even when the gas pedal is not actuated. Under such circumstances, the automated torque transmitting system assumes, based on the then available sensor values, that the gas pedal is being actuated on purpose, for example by the driver, and a shifting of the transmission or transmission gears is difficult to accomplish due to the absence of disengagement of the torque transmitting system.

In a motor vehicle with an automated torque transmitting system, it is necessary that an actuation of the servicing element, such as for example a gear shifting lever, can lead to a disengagement of the torque transmitting system when it appears likely, on the basis of sensor signals that were evaluated by the control unit, that such actuation is indeed desired by the driver. However, a disengagement of the torque transmitting system should not take place in each and every case to thus ensure that an unintended interruption of acceleration of the vehicle will not occur when a shifting operation is not desired, for example, at high rotational speeds of the engine and merely as a consequence of the placing of a hand onto the servicing element. In accordance with DE 17 55 528, this is accomplished in that a disengagement of the torque transmitting system takes place only at a minimal position of the throttle valve.

OBJECTS OF THE INVENTION

An object of the present invention is provide a vehicle which comprises an automated torque transmitting system and renders it possible to reliably and effectively shift into various transmission gears basically under all relevant operational circumstances.

Furthermore, it is an object of the present invention to provide a motor vehicle of the above outlined character which is designed in such a way that, even in the event of the development of problems or defects in the region of the gas pedal system, it is still possible to shift from or into a desired transmission gear.

Furthermore, it is an object of the invention to improve motor vehicles of the above outlined character. Furthermore, it is an object of the invention to enhance the operativeness of the above outlined motor vehicles and to provide vehicles which, under circumstances, even permit the achievement of a reduction of cost.

In accordance with the invention, such solution is accomplished in that one generates a control signal when a load lever, such as a gas pedal, and a brake are actuated simultaneously while the servicing element is being actuated.

It can be of advantage if the brake is a vehicle brake or a parking brake, such as for example a manually operated brake.

Furthermore, it can be desirable that, among other situations, the control signal be generated also when a load lever and a vehicle brake and a parking brake are actuated simultaneously while the servicing element is being actuated.

Furthermore, the object of the invention can be accomplished in that a control signal is generated when the servicing element is actuated while the speed of the vehicle is less than a preselectable limit value.

It is of advantage if the preselectable limit value is within a range of 0 to 50 km/h, preferably of 0 to 30 km/h, and especially of 0 to 10 km/h.

Furthermore, it can be of advantage if, in a motor vehicle with a driving unit and a transmission and an automated torque transmitting system, the transmission ratio being selectable by means of a servicing element such as for example a gear shifting lever, a sensor arrangement detecting the actuation of the servicing element and a control unit being adapted to generate a control signal in response to which the torque transmitting system is disengaged in the event of actuation of the servicing element, the control signal be generated and the torque transmitting system be disengaged in the event of actuation of the servicing element and in response to fulfillment of at least one of the following prerequisites:

- the idling switch is actuated,
- the load is smaller than a preselectable limit value,
- the throttle valve angle is smaller than a preselectable limit value,
- the vehicle brake is actuated,
- the parking brake is actuated,
- a sensor indicates that a vehicle door is open,
- the speed of the vehicle is less than a preselectable limit value,
- the engine torque is smaller than a preselectable limit value,
- the engine RPM is smaller than a preselectable limit value,
- the value of the gradient of the engine torque in the event of a negative gradient exceeds a preselectable limit value,
- the value of the gradient of the engine RPM in the event of a negative gradient exceeds a preselectable limit value,
- the value of the gradient of the vehicle speed in the event of a negative gradient exceeds a preselectable limit value.

The individual preprequisites can be linked by AND or OR-connections.

For example, the disengagement of the torque transmitting system takes place also when the engine torque which has been ascertained by the control unit is above a preselected limit value but the nature of the other signals is such that they can be interpreted as denoting a desire by the driver to shift the transmission into a different gear.

Furthermore, it might be desirable that an intention to shift be found to be permissible if the engine torque exceeds a preselectable limit value, the engine RPM exceeds a preselectable limit value, the value of the gradient of the engine torque at a positive gradient is less than a preselectable limit value, the value of the gradient of the engine RPM at a positive gradient is less than a preselectable limit value and/or the value of the gradient of the vehicle speed at a positive gradient is less than a preselectable limit value, and if such prerequisites are satisfied alone or in combination with other prerequisities in order to reach the conclusion that an intention to shift actually exists.

Furthermore, it can be of advantage if, in a motor vehicle with a driving unit, a transmission and an automated torque transmitting system, the transmission ratio being selectable by means of a servicing element such as for example a gear shifting lever, a sensor arrangement detecting the actuation of the servicing element and a control unit being adapted to generate a control signal in response to which the torque transmitting system is disengaged in the event of actuation of the servicing element, the control signal be generated and the torque transmitting system be disengaged in response to actuation of the servicing element and after elapse of a waiting time Δt, provided that the servicing element continues to be actuated after the elapse of such waiting time and in response to fulfillment of a least one of the following prerequisites:

the idling switch is actuated, the load lever is smaller than a preselectable limit value, the throttle valve angle is smaller than a preselectable limit value, the vehicle brake is actuated, the parking brake is actuated, a sensor indicates that a vehicle door is open, the vehicle speed is less than a preselectable limit value, the engine torque is smaller than a preselectable limit value, the engine RPM is smaller than a preselectable limit value, the value of the gradient of the engine torque in the event of a negative gradient exceeds a preselectable limit value, the value of the gradient of the engine RPM in the event of a negative gradient exceeds a preselectable limit value, the value of the gradient of the engine speed in the event of a negative gradient exceeds a preselectable limit value.

The aforementioned waiting time can be within the time range of 0.1 second to 10 seconds, preferably within the time range of 0.5 second to 5 seconds.

Furthermore, in can be advisable in accordance with a novel concept if the gear shifting gate will be/is divided into at least two regions in which different limit values are utilised for detection of a shifting intention. This means that, for example, higher shifting lever speeds are required in one region than in another region in order that the control unit reach a conclusion that there actually exists an intention to shift into a different gear.

It can also be of advantage if the limit values which are utilised for a determination of an intention to shift be varied for example as a function of time.

Furthermore, such limit values or threshold values can also be varied as a function of other operational parameters, for example, as a function of the engine RPM.

It can be of advantage if, on reaching or exceeding of the limit values, such limit values be altered, such as raised or lowered, by the actual data. Furthermore the changes can be altered, again, in dependency on time.

In accordance with a further novel concept, it is of advantage if a control signal is generated also when, in addition, there is actuated a load lever, such as a gas pedal.

BRIEF DESCRIPTION OF THE DRAWINGS

The invention will be explained in greater detail with reference to the Figures. There are shown in.

DESCRIPTION OF PREFERRED EMBODIMENTS

Figure 1:
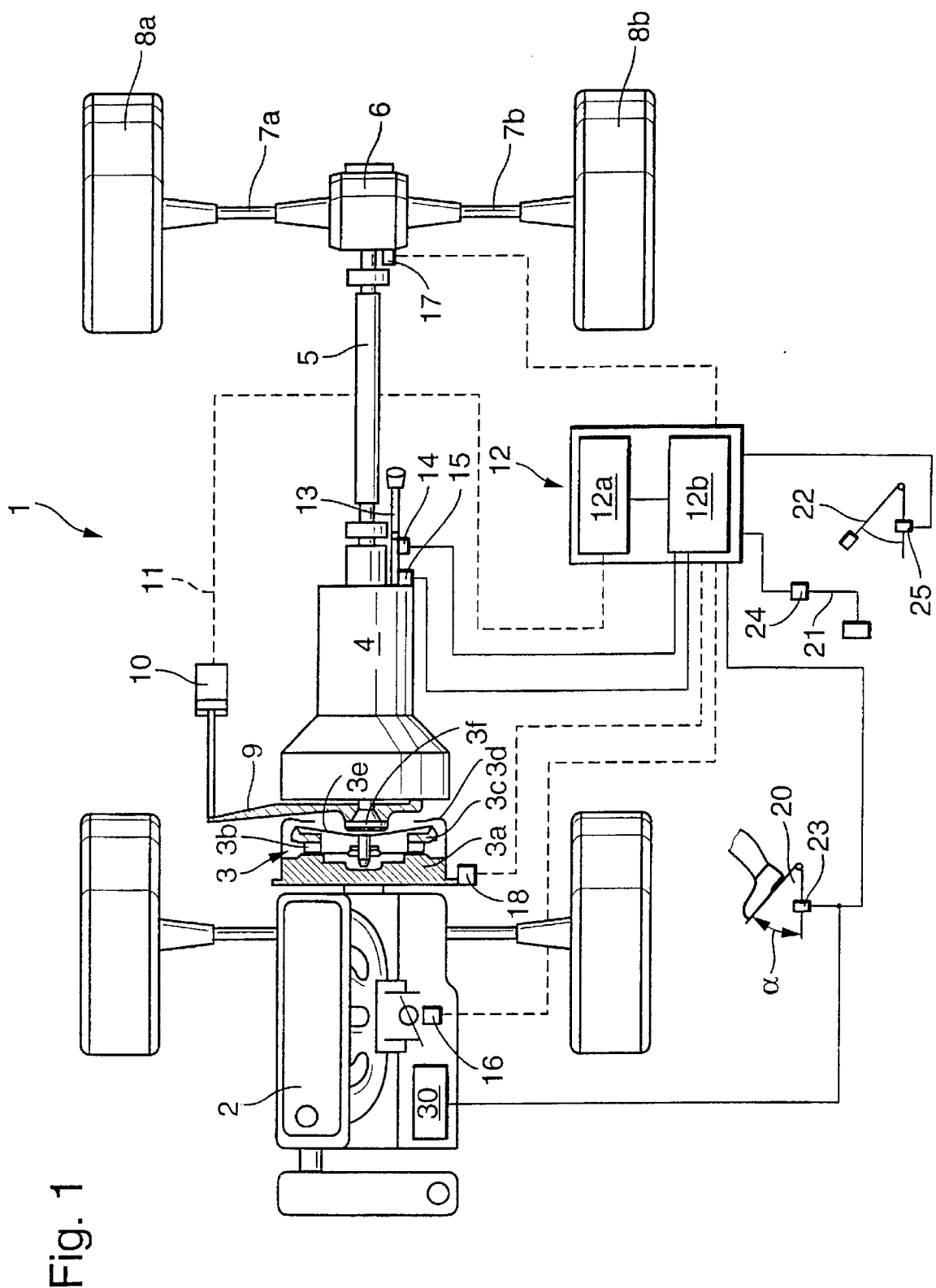
FIG. 1 a schematic representation of a vehicle.

FIG. 1 shows a vehicle 1 in a schematic representation with a driving unit 2, a torque transmitting system 3 and a transmission 4. The transmission is followed by a drive shaft 5 and a differential 6 as well as the driven axles 7a and 7b, the wheels 8a and 8b being driven by way of the driven axles 7a and 7b. The vehicle can also be equipped with a four-wheel drive. However, this is not shown in FIG. 1.

The torque transmitting system 3, such as for example a friction clutch, a magnetic powder clutch or a torque converter with torque bypass clutch, is shown in FIG. 1 as in the power train between the engine 2 and the transmission 4; however, it is also possible to install the torque transmitting system 3 at the downstream side past the transmission 4 in a manner which can be of advantage, for example, with infinitely variable speed transmissions (CVT).

In the embodiment which is shown in FIG. 1, the torque transmitting system 3 comprises a clutch disc 3b with friction linings, a pressure plate 3c as well as a clutch cover 3d and a diaphragm spring 3e. These parts of the torque transmitting system can be mounted on a flywheel 3a, and they can also be assembled with the flywheel 3a as a preassemblable unit. Also, the flywheel can constitute a so-called twin-mass flywheel which comprises a torsional vibration damper between a primary and a secondary mass. The diaphragm spring 3e is acted upon by a disengaging bearing 3f to engage or disengage the clutch. By causing the disengaging bearing 3f to act upon the tongues of the diaphragm spring, the clutch can be induced to assume a condition or can be adjusted in such a way that it assumes a condition which is a fully engaged or a fully disengaged condition or a condition between such extreme conditions. In this manner, the torque which can be transmitted by the torque transmitting system 3 can be selected or fixed at will within the range between zero and the maximum value.

In the embodiment of FIG. 1, the disengaging bearing is actuated by a disengaging lever 9, and this disengaging lever is actuated by a hydraulic system with a slave cylinder 10, a hydraulic conduit 11 and an actuator 12. The actuator 12 contains an adjusting device 12a which, if a hydraulic system is employed, comprises a master cylinder and a driving unit for actuation of the master cylinder. The actuator 12 further comprises an electronic arrangement 12b, such as a control unit, which processes signals being transmitted for example by sensor arrangements, sensors or other electronic units and generates control signals in order to operate the driving unit of the actuator for the purpose of engaging or disengaging the torque transmitting system.

The transmission 4 is a transmission in which one can distinguish between various transmission ratios, such as gears, by means of a servicing element 13. In order to select a transmission ratio among a plurality of transmission ratios, the servicing element 13 is moved to the corresponding position or is actuated in a manner and wise provided therefor. Such actuation can be effected manually or automatically.

As already mentioned above, the arrangement for disengaging the torque transmitting system can be operated by a pressurized-fluid system, and such pressurized-fluid system can constitute a hydraulic system, a pneumatic system or another fluid-operated system. In such instances, the disengaging element can also constitute a central disengaging element which is operated by a pressurised fluid. Further, the actuation can be effected by mechanical means, such as for example a linkage.

A sensor arrangement 14 can be coupled to or provided on the servicing element 13, and this sensor arrangement detects an actuation of the servicing element. The detection of an actuation can take place by measuring an acting force or by measuring a change of position or of a change of speed or acceleration. Furthermore, the actuation can be detected in the event of exceeding a limit- or threshold value during a movement or actuation of the servicing element.

The sensor or the sensor arrangement 14 can be a travel- or velocity- or acceleration- or force-dependent sensor which detects or which can detect a movement of the servicing element or of an element which is connected therewith or a force acting upon the servicing element or upon an element which is connected therewith.

Furthermore, it is possible to provide on the transmission 4 a sensor 15 which detects the position of the shifted-in gear, for example, by sensing the position of shifting elements in the interior of the transmission.

The sensors, such as the throttle valve sensor 16, the wheel RPM or velocity sensor 17 (vehicle speed sensor), engine RPM sensor 18 and further sensors can be provided in/at the vehicle and connected with the control unit by signal transmitting conductors. It is also possible to provide on the vehicle a door sensor which detects whether a door is open. It is also advisable to provide a sensor for detection of the throttle valve angle. The control unit can also serve to calculate, from the data furnished by sensors, gradients which are utilized to evaluate the intention to shift. For example, such gradients can be calculated by resorting to numerical procedures. Based on the sensor data and other data as well as system input values, the control unit 12 ascertains the condition of the vehicle and generates a control signal for actuation of the torque transmitting system 3 in the event of conclusion that an intent to shift does exist.

If the driver actuates the servicing element of the transmission, the control unit disengages the torque transmitting system by generating a signal to disengage the torque transmitting system. However, as a rule, this happens only when the calculated or ascertained engine torque is smaller than or equals a preselectable value of torque. Furthermore, an intention to shift can be rated as suppressed or as not established when, in addition to the determined engine torque, the position of the throttle valve or the position of the load lever also exceeds a limit value.

The motor vehicle 1 further comprises a gas pedal 20, such as a load lever, as well as an actuating element of a brake 21, such as a vehicle brake, as well as an actuating element 22 for a brake, such as a parking brake. At the load lever 20, there is disposed at least one sensor 23 which ascertains not only the extent of displacement a but also the presence or absence of an actuation. A sensor which can determine whether the pedal brake or the load lever is or is not actuated can constitute an idling switch which is on when the pedal is not actuated and which is off when the pedal is actuated.

At the actuating element 21 for the vehicle brake, such as a brake pedal, there can be provided a brake switch 24 which detects whether the brake is actuated. Such a brake switch can also be provided at the actuating element 22 for the parking brake, and the sensor 25 detects whether the parking brake is actuated.

Furthermore, the sensoric arrangement 23 for the load lever 20 can be in signal transmitting connection with the engine electronics 30 so that, in response to actuation of the gas pedal, the engine electronics 30 regulate the engine RPM and the engine torque accordingly.

Based on the signals, such as measurement data and system input values, which are being transmitted to the control unit 12, it is possible to ascertain the then transmitted engine torque.

The transmitted engine torque is the actual engine torque minus/plus the torques which are taken up or transmitted by the auxiliary aggregates. For example, an air conditioning system or an inertia flywheel can be termed an auxiliary aggregate. Furthermore, it is possible to take into consideration drag torques.

Furthermore, it is possible to ascertain whether the servicing element 13 is being actuated, whether a brake 21, 22 is being actuated and whether the gas pedal, such as load lever, is being actuated. The control unit 12 recognises an intention to shift on the basis of actuation of the servicing element 13 in response to signals which are being transmitted by the sensor 14 and/or 15. Whether an intent to shift is evaluated or accepted by the control unit as a desire to shift and results in the generation of a control signal to disengage the clutch depends upon the system parameters.

For example, it is not invariably desirable that a shifting intention denoting signal be invariably interpreted as denoting an imminent gear shifting operation. As a rule, it is assumed—as a prerequisite for a desired gear change or for shifting out of a particular gear—that the engine torque be below a preselectable limit value and/or that the extent of actuation of the load lever be less than a preselectable limit value. This means, for example, that the load lever is not actuated and that this is being indicated by the idling switch. However, such a prerequisite does not suffice under certain circumstances which are critical for proper operation or adequate safety.

Furthermore, such prerequisites can be interlinked in such a way that not only is the engine torque below a preselectable limit value but the extent of actuation of the load lever is also below a preselectable limit value. Furthermore, it can be of advantage that, under certain driving conditions, while exceeding at least one of the aforementioned limit values an intention to shift is interpreted as existing nevertheless and the control unit generates a control signal so that the torque transmitting system is disengaged. For example, such control signal can be generated if, for example, an actuation of the servicing element for the purpose of gear shifting takes place simultaneously with the actuation of the load lever and e.g., one of the brakes. Furthermore, it can be of advantage if, at a vehicle speed which is less than a comparable reference speed, the control signal to disengage the torque transmitting system is generated during actuation of the servicing element.

Such acceptance of an intention to shift and the generation of a control signal at low vehicle speeds might be desirable in the event of a disturbance, for example, of the gas pedal, e.g., as a result of jamming or another faulty operation, in order to shift from a particular gear. This is particularly desirable while the vehicle is being driven at low speeds, such as for example within the velocity range of between 0 and 50 km/h, preferably of 0–30 km/h or of 0–10/20 km/h.

A further regulating method which can be of advantage in the event of the aforementioned operating conditions or faulty operations of the gas pedal system or in the vehicle can be that simultaneous actuation of a brake and of the gas pedal allows for acceptance of an intention to shift whereupon the control unit generates a control signal in order to disengage the torque transmitting system.

In addition to the brake or brakes, it is also possible to employ additional signals which, for example, must be present simultaneously with that from the gas pedal in order to accept an intention to shift in response to an actuation of the servicing element and to generate a control signal which disengages the torque transmitting system.

If the gas pedal system is operative, it is advisable that the control unit ascertain an intention to shift on the basis of incoming signals, and such intention is examined prior to generation of a control signal for the purpose of disengaging the torque transmitting system. When the brake is not applied or when the vehicle speed is high, it might be advisable that the control unit evaluate a shifting intention signal as non-existent in spite of actuation of the servicing element when the engine torque exceeds a certain limit value. This should prevent faulty disengagements because one can assume that the driver would be unlikely to shift when the engine torque is high. However, if a reduction of the engine torque has taken place, one can assume that the driver would like to shift and, under such circumstances, it is desirable that the intention to shift be interpreted as such and entails the generation of a control signal in order to disengage the torque transmitting system.

However, even following a cold start, the engine might be capable of furnishing—for example as a result of ignition shift or cold start enrichment or in accordance with other methods—during idling a torque which is above the limit torque and prevents that an intention to shift be evaluated as such and that it entail the generation of a control signal for disengagement of the clutch. Therefore, it might be advisable as a rule or under such operating conditions to also monitor the idling switch in addition to a comparison of the actual engine torque with a limit value. If the idling switch is actuated, i.e., if the throttle valve value is below a limit value, the intention to shift is interpreted as such and there is generated a control signal which entails a disengagement of the torque transmitting system. Thus, an intention to shift is always possible during idling, namely when the idling switch is actuated, and a shifting operation is rendered possible in that the torque transmitting system is disengaged in response to actuation of the servicing element.

If, based on the input signals such as sensor values and other signals, the control unit 12 detects an intention to shift, such intention is first tested prior to disengagement of the clutch. Under customary circumstances of operation of the vehicle, it is advisable that the intention to shift be disregarded by the control unit when the engine torque exceeds a predetermined limit value. Such predetermined torque, minus for example the drag torques and torques attributable to auxiliary consumers, is compared by the control unit with a reference value and, when the engine torque exceeds the limit value, an intention to shift is interpreted as non-acceptable and the torque transmitting system is not disengaged. This should prevent faulty disengagement because one can assume that the driver would not wish to shift while he demands a torque (output). However, it is also conceivable to resort to other mechanisms which prevent an intention to shift under certain circumstances, for example, a time delay during forwarding of the intention to shift. This means that, in spite of a high engine torque, an intention to shift which is indicated upon actuation of the servicing element will be accepted after elapse of a waiting time $\Delta t$ provided that an actuation of the servicing element is still present after elapse of the waiting time. Under such circumstances, the torque transmitting system is disengaged in spite of the existence of a high engine torque.

The aforementioned waiting times can be within a time span of 0.1 second to 10 seconds, preferably within a time span of 0.5 second to 5 seconds.

Following a cold start, the engine in its capacity as the driving unit of the vehicle can furnish during idling an engine torque which is above the preselectable limit value, for example, as a result of an ignition shift and/or cold start enrichment or by resorting to other methods. This can entail, under certain circumstances, a rolling of the vehicle and, due to a cancellation of the intention to shift, it is not possible or quite difficult to shift the transmission out of gear. Such situation can become critical from the standpoint of safety if the shifting intention is interpreted as not recognised and the torque transmitting system remains engaged. Furthermore, it can become critical if the gas pedal becomes stuck, for example, due to a defect while the engine is not idling and, therefore, the intention to shift cannot be followed. It can also become critical, from the standpoint of safety, if the intention to shift is disregarded for other reasons.

A solution in accordance with the invention provides that the intention to shift is always accepted as being in existence when the idling switch is actuated, namely when the gas pedal has reassumed its idling position of rest. Furthermore, it might be advisable that, in addition to those furnished by the idling switch, other signals resp. their combinations be utilised in order to accept the shifting intention, i.e., to disengage the torque transmitting system in response to an actuation of the servicing element. It can be particularly desirable if the idling switch is actuated and/or the gas pedal value, namely the load pedal value is below a limit value. Analogously, it is possible to take into consideration also the signal denoting the angle of the throttle valve or other signals denoting that the driver demands an output, and such signals, too, should be below preselectable threshold values. Furthermore, it can be desirable to recognize or interpret a shifting intention as valid when the vehicle brake is operated or when the parking brake is actuated. Furthermore, it is possible to address a door contact switch and to accept an intention to shift when a door is open and this is being indicated by the signal from the door contact switch. It is also possible to employ other signals which indicate that the driver does not desire to set the vehicle in motion. For example, this can happen when a driver in the vehicle is not recognised, such as for example by a seat sensor so that the shifting out of gear must be carried out by a driver's mate which, in such case, should be prevented by the control unit if at all possible.

It can also be desirable if an intention to shift is invariably accepted at lower driving speeds, such as for example within the range of from 0 to 10 km/h or 0 to 20 km/h or 0 to 50 km/h.

It can also be desirable if an intention to shift is accepted on actuation of the servicing element for the purpose of changing the transmission ratio and the torque transmitting system is disengaged when the engine RPM is below a preselectable limit value, such as about 1400 RPM or 2000 RPM.

Still further, it can be of advantage if the value of the gradient of RPM and/or speed of the vehicle is above a preselectable value; in such case, the gradient should be a negative gradient.

For example, such a situation can arise when the driver would like to stop but is incapable of shifting out of gear.

It is further proposed that, in such cases and/or all other combinations of characteristics, the shifting intention recognition be set to be more sensitive. For example, the shifting intention thresholds can be set to be below those under other, namely typical, driving conditions. Such more sensitive setting of the recognition of the intention to shift denotes that the threshold values which are set as preselectable threshold values are shifted nearer to the position of a non-actuated system or nearer to the values of the non-actuated servicing element in order to detect, on the basis of values of signals furnished by the sensors, whether or not the servicing element has been actuated.

A change of the thresholds of intention to shift or of preselectable limit values which lead to the intention to shift can also be regulated in dependency on time which means that an intention to shift takes place after a certain time delay. Different shifts in time can be defined for different driving conditions.

Furthermore, it can be of advantage if the limit values are preselectable under customary driving conditions. Under those circumstances of the operation of a vehicle when safety-related situations might become relevant with a higher degree of probability, it is possible to carry out a staggered utilisation of limit values. For example, if an actuation of the servicing element takes place in a situation when the engine torque is higher, the intention to shift can be suppressed upon exceeding of a first threshold value because it is assumed that a desire to shift does not exist. However, if the actuation continues and the servicing element is guided beyond a second threshold value, one can assume that an intention to shift does exist and the transmission of torque can be interrupted because one can assume that the driver of the vehicle knowingly actuates the servicing lever. Therefore, it is proposed to define for the threshold values a second set of disengaging thresholds and to introduce such values for the recognition of an intention to shift. If the actuation of the servicing element exceeds such second threshold as a result of actuation of the servicing element by the driver, an intention to shift can be presumed independently of other signals and the torque transmitting system can be disengaged in response to the generation of a control signal.

As already explained hereinbefore, a detection of an intention to shift is carried out by at least one sensor which monitors the movement of a servicing element and/or the position of a servicing element and/or the speed and/or the acceleration of a servicing element. Furthermore, such a sensor can also detect the application of forces to the servicing element, either directly or indirectly. By utilizing a distance sensor in the region of the servicing element and a movement sensor in the region of shifting elements in the interior of the transmission, and if one assumes the presence of elastic parts in the power flow between the servicing element and the internal shifting elements of the transmission, it is possible to carry out a measurement of differences between various distances in order to obtain a signal which is proportional to or representative of the forces and can be utilized for an evaluation of the intention to shift.

It is further possible to carry out, among others, a velocity-dependent recognition of an intention to shift when the vehicle employs an automated clutch system. If the velocity of the shifting lever (such velocity can be filtered or otherwise modified) exceeds a preselectable limit value, an intention to shift may exist and can be initiated by the control unit. The speed of the shifting lever can be evaluated in different ways in dependency upon the direction, for example in a direction toward the position in neutral gear or in the opposite direction. If the transmission is shifted into a gear by hand, the driver normally forces the gear shifting lever in a direction toward and beyond the selected gear in order to ensure that the transmission is being shifted into the desired gear. As used herein, the term forcing or overshifting is intended to denote that the shifting lever, such as the aforementioned servicing element, is caused by the driver to move in a direction toward the selected gear beyond that position and/or with a force greater than necessary for actual shifting into such gear. Such overshifting entails an elastic prestressing of some or even all of the elements which participate in a gear shifting operation. When the driver thereupon releases the lever, the latter can relatively rapidly return to the actual (non-exceeded) position of rest in the selected gear. Such return movement or relaxation to the actual position in a selected gear can take place at a speed which exceeds the preselectable limit speed for recognition of an intent to shift. Such exceeding by the actual velocity of the preselectable limit value can be detected and unintentionally interpreted as an intention to shift so that it actually triggers a shifting operation with short-lasting disengagement of the clutch. When the step of relaxation of the shifting lever is completed, the shifting lever is again at a standstill essentially in a position corresponding to the idle condition of the gear shifting means and the intention to shift no longer exists.

Such short-lasting disengagement subsequent to release of the shifting lever from its overshifted position furnishes an undesirable uncomfortable effect. The rebounding or relaxing of the shifting lever basically takes place within a range which, in a direction toward neutral, is limited by the position of rest of the shifting lever when the transmission is in gear. As long as the shifting lever dwells within such range, which might possibly be widened by a tolerance band, the intention to shift can be additionally scanned or rendered more difficult or prevented in one or more following ways.

This range is a range of positions of the shifting lever starting from the position of rest in gear and in a direction away from the neutral position.

Figure 2:
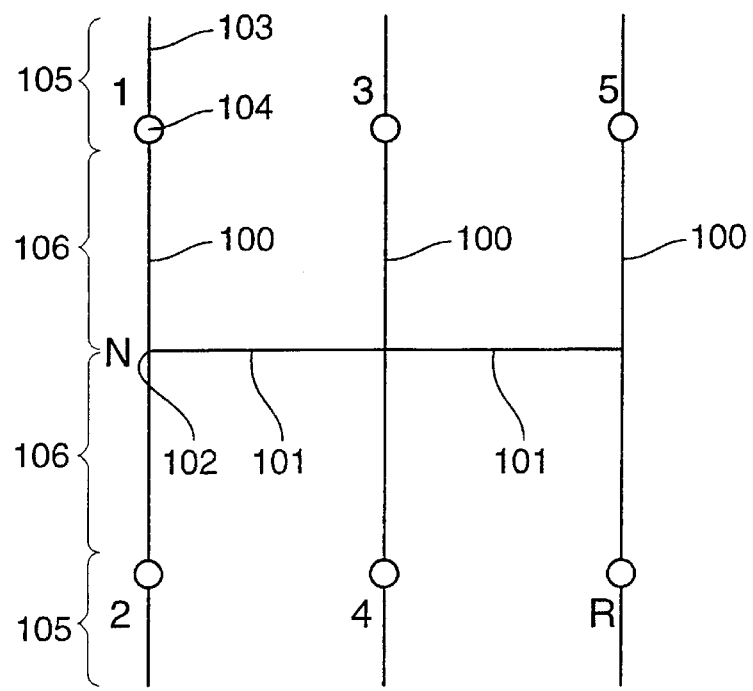
FIG. 2 a representation of a gear shifting gate.

FIG. 2 illustrates this situation in connection with a typical gear shifting gate for movements of a gear shifting lever in a change speed gear. The servicing element or shifting lever is moved along the several shifting paths 100 to shift into and from gears, for example, from the neutral position along the selecting paths 101 to change its position between the shifting paths 100. For example, in order to move the shifting lever from a neutral region into the first gear, the shifting lever is guided, for example, from the point 102 to the point 103 because the driver does not know exactly the position of rest in the first gear 104 and, as a rule, does not immediately advance the shifting lever exactly to the optimum position for the first gear. When the shifting lever is released, it relaxes or eases into the gear rest position 104, i.e., the shifting lever moves from the point 103 to the point 104. In the course of such movement, the shifting lever can attain a speed which can exceed the preselectable limit value that is required to initiate a shifting intention. Therefore, and as concerns the threshold values as well as the initiation of a shifting intention, the region 105 is interpreted differently from the region 106 which latter extends from the rest position 104 for the particular gear in a direction toward neutral. On the other hand, the region 105 is directed from the gear rest position 104 and away from neutral.

Figure 2A:
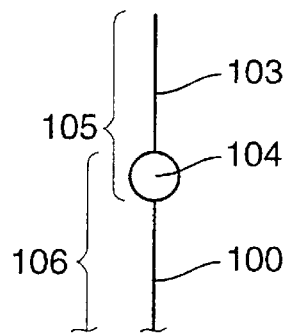
FIG. 2a a detail of a gear shifting gate.

In the selected region 105 which, in the region of the gear rest position, can overlap for example with the region 106 in a manner as shown in FIG. 2a, there can exist a changed or altered evaluation of signals for recognition of the intention to shift, as compared with an evaluation in the region 104 and/or 106. In the region 105 of overstressing, an intention to shift can invariably be interpreted as being undesirable.

Furthermore, it is possible to raise the preselectable limit values or release threshold in the region of overstressing, i.e., an initiation of the intention to shift in the region of overstressing must satisfy increased requirements as concerns the changes pertaining to the servicing lever or shifting lever. Furthermore, it is possible to filter the movement or velocity signals from the sensors, especially to resort to a more pronounced filtering action than in the normal region. In this context, this is intended to express that the filtering operation is carried out with an increased time constant which entails a time-dependent smoothing or also a delay of the effects. Still further, it is desirable to resort to the above enumerated methods only for a limited period of time and, once such period has expired, a recognition of the intention to shift is carried out in accordance with methods which can also be resorted to in the region 106. As the start of the interval of time Δt subsequent to which the recognition of an intention to shift is again carried out in accordance with normal methods, one can take into consideration the instant of recognition of a new gear which has been shifted into or the instant of reaching the position of rest in the newly shifted into gear or the instant of the start of overstressing or exceeding of the position of rest in the particular gear or of the exceeding of an overstressing limit.

Furthermore, it can be of advantage if an intention to shift is considered as non-existent, so that a disengagement of the torque transmitting system is prevented, only while the signal or signals from sensor or sensors indicates or indicate an overstressing. For example, an overstressing can be detected by measuring the magnitude of the force or by measuring the extent of stretching of the external circuitry, namely the connection between the shifting lever and the transmission. Still further, it is possible to resort to a combination of the aforementioned conditions.

The region of overstressing and the location of the shifting lever in such a region of overstressing can be monitored by the existing sensors, or one employs additional sensors which can be designed, for example, as digital or continuous, analog sensors and monitor the position of the shifting lever in the region of overstressing.

As described hereinbefore, the detection of an intention to shift on the basis of a movement of a servicing element necessitates the division of the actuating movement of the servicing element into at least two regions. Starting from the neutral position, one of the regions is selected to extend essentially to the position of rest in the selected gear and the second region extends, starting essentially from the position of rest, in a direction away from the neutral position. One can resort to different evaluations of sensor signals, of the movement, position, speed, acceleration or force of the servicing element or upon the servicing element, depending upon whether the servicing element is located in the one or the other region. It is preferred to carry out an increase of the preselectable limit values in that one region which is the region of overstressing in order to avoid a shifting intention as a result of a relaxation of the shifting lever upon completion of a gear shifting operation.

Figure 3:
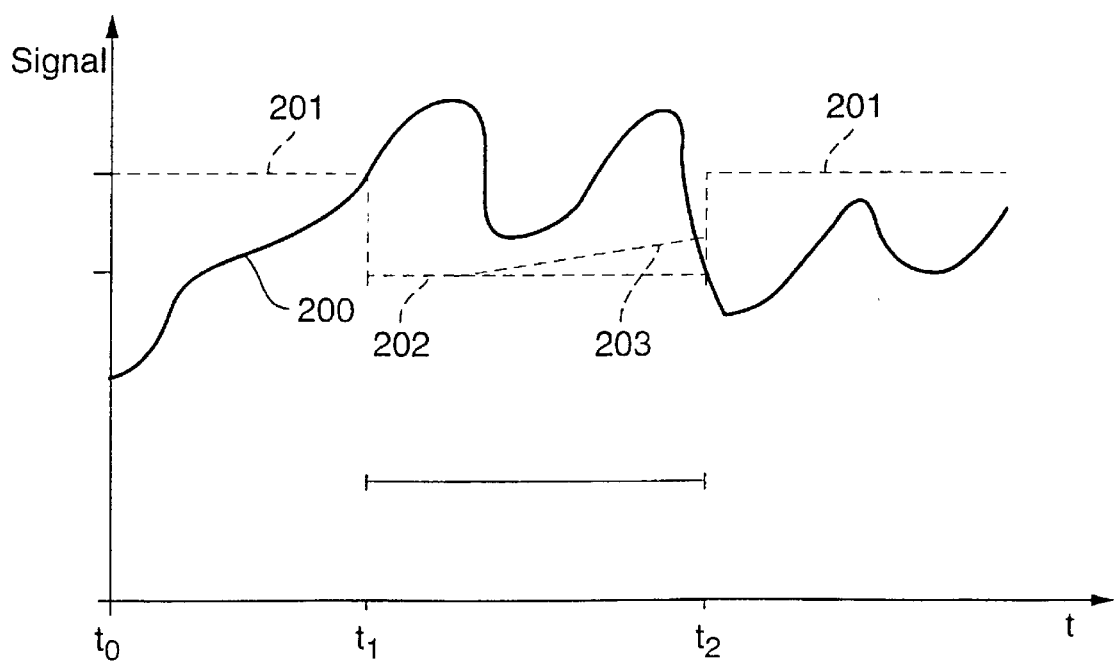
FIG. 3 a diagram.

When the clutch is an automated clutch, the basic purpose of detection of the intention to shift is to ascertain the desire of the driver as far as shifting is concerned. If a desire to shift is detected on the basis of sensor signals which are being transmitted to the control unit and an appropriate evaluation of such signals, the clutch is normally disengaged in order to ensure that shifting out of a gear is made possible in response to the exertion of a relatively small force by the driver of the vehicle. In many instances, the intention to shift is detected in such a way that one or more sensor signals, which might have already undergone a preliminary treatment, such as filtering, exceed a fixed or a variable preselectable threshold. This can readily entail a back and forth shifting of the intention to shift if the sensor signal alternately execeeds and falls below the preselectable threshold, i.e., if the intensity of the signal fluctuates. For example, such a situation can arise if the intention to shift is recognized on the basis of fixed distance thresholds and the position of the manually shiftable lever exceeds such thresholds. If the driver maintains the shifting lever on the border of distance thresholds, for example, by placing his hand in the region of the shifting lever, or shifts very slowly, even slight vehicle- or driver movements, such as oscillations, can entail repeated exceeding and falling below the threshold values. Even a disengagement of the clutch can entail an acceleration of the vehicle which can influence the shifting lever through the driver or through the vehicle. In the event that the intention to shift is detected as a result of force measurement at the shifting lever, or at another location between the transmission and the shifting lever, it is also possible that there develops a back and forth oscillation or an exceeding or falling below the threshold values. An intention to shift is initiated when the actuating force exceeds a certain limit value. This, too, can result in oscillations, i.e., in exceeding of or in falling below the threshold value as a consequence of intentional or unintentional retention at the release threshold. Such effect is enhanced in that the clutch becomes disengaged in the event of an intention to shift. This causes the transmission to furnish no output or a lesser output and the shifting force can be reduced. This entails a decrease of the actuating force and the release threshold is not reached. A similar effect can develop also in the event of a measurement of differences between distances which involves distance measurements at two locations in the region between the shifting lever and the shifting elements for the transmission, it being assumed that elastic parts are disposed between the two locations. Under such circumstances, it might be of advantage if the preselectable limit values, which must be exceeded in order to initiate an intention to shift are provided with a hysteresis which means that, if the preselectable limit value is exceeded, the limit value is reduced by an amount ΔGrenz. In other words, the signal must exceed the threshold. As soon as the signal has exceeded the threshold of the intention to shift, or has exceeded the limit value, the threshold is caused to be lowered by a certain amount. The intention to shift is withdrawn and the threshold or the limit value is increased again only when the signal again drops below the lowered threshold or the lowered limit value. The amount ΔGrenz of lowering can be variable or a function of time. The value ΔGrenz can be selected in different ways and can even rise or fall thereafter as a function of thine in dependency on the operating point, such as for example the selected gear, the engine RPM or the position of the throttle valve. Alternatively, it is also possible to manipulate, namely increase, the signal value. The extent of lowering and subsequent increase can even begin as a function of time and can also be withdrawn as a function of time. Such situation is illustrated in FIG. 3 wherein a signal, for example that from a sensor, for detection of an intention to shift is represented as a function of time. For example, the signal can denote the position of the servicing element, such as a shifting lever, and is detected as a function of time.

From the instant $t_0$ to the instant $t_1$, the signal 200 is below the preselectable limit value for the initiation of an intention to shift. At the instant $t_1$, the signal 200 exceeds the threshold of the intention to shift at which time the threshold of the intention to shift is immediately lowered from the value 201 to the value 202. The signal 200 varies during the interval between $t_1$ and $t_2$ but it reaches the threshold 202 only at the instant $t_2$ so that, from the instant $t_2$, the intention to shift is interpreted as having been withdrawn. Simultaneously, namely at the instant $t_2$, the threshold of the intention to shift or the preselectable limit value for the initiation of an intention to shift is reset to the value 201. It is also possible to provide a time-dependent threshold 203 as an alternative of the fixed threshold 202.

If an intention-to-shift signal is present, i.e., the servicing element is being actuated and, for example, the engine torque is below a preselectable threshold value, the control unit generates a control signal so that the torque transmitting system is disengaged. The disengagement of the torque transmitting system can take place as expeditiously as possible or at a variable speed in dependency upon the shifting operation. For example, based on the incoming signals the control unit can ascertain and recognise the driving condition of the vehicle and, based on the information pertaining to the operating condition, the clutch can be engaged at a lower or at a higher speed when an intention to shift does exist. This can be of advantage in order to weaken or avoid impacts on disengagement of the clutch. If, upon recognition of an intention to shift, the shifting velocity (namely the speed of movement of the servicing element) is below a preselectable threshold and at the same time, for example, the engine torque is below a preselectable threshold and/or the speed of the vehicle is below a preselectable threshold, the clutch is disengaged at a slower rate but at a predetermined speed, for example, at 30 Nm per second.

As a rule, a normal shifting operation takes up an interval in the range of between 0.1 second and 0.5 second. Thus, a slow shifting operation can stretch out for an interval of for example 0.4 second to 2 seconds or even longer. The lower limit for such a slow shifting operation from one shifted-into gear to another shifted-into gear can depend, however, upon the vehicle and the transmission which is being utilized in the vehicle. The shifting operation can be identified as a slow shifting operation if, upon selection of a fixable distance, a preselectable interval of time or a limit value for a preselectable duration of a slow shifting operation is already exceeded in the course of a shifting movement but the limit for the preselectable distance is not exceeded. Furthermore, the next step can involve an actuation of the torque transmitting system in accordance with the prerequisites for a slow gear shifting operation, for example, a slow disengagement of the torque transmitting system.

For example, the normal speed of opening the actor can be in the range of between 1 to 5000 Nm per second. During that stage of operation of the vehicle when the vehicle is creeping, such creeping being effected as a result of transmission of a small torque, for example, 10–20 Nm, it might be advisable to disengage the clutch slowly in the event of an intention to shift. If the clutch is disengaged at a speed of 30 Nm per second, and if the transmissible creeping torque is in the range of 15 Nm, the clutch can be readily disengaged within an interval of one-half of one second. The speed of disengagement of the torque transmitting system can be calculated or determined in dependency upon the operating condition and can be selected differently in dependency upon the driving conditions and the shifting situation.

The full range of velocities of the actor for the torque transmitting system is available for the selection of the speed of disengagement.

As described hereinabove, the shifting intention signal is a digital signal which means that there exists an intention to shift, or it is classified as non-existent, or it does not exist. Furthermore, it is possible to determine or calculate and process the shifting intention signal as a continuous signal. The clutch torque can be reduced even prior to exceeding of a release threshold or of a preselectable limit value for the initiation of an intention to shift. The transistion from "slow disengagement" of the torque transmitting system to "rapid interruption" of the torque transmitting system would then constitute a continuous transition, depending on the nature of actuation of the servicing element by the driver. A continuous transition would also exist for the duration of actual disengagement in the event of a gear shifting operation. Under such operating circumstances, there can develop a short-lasting phase of slip prior to disengagement of the torque transmitting system while the power train is not under stress so that one can in this manner counteract the buildup of a vibration at the input side of the transmission. This means that an at least slight disengagement of the torque transmitting system is already initiated in response to detected movement of the servicing element even though the preselectable threshold value for the recognition of an intention to shift has not been exceeded as yet. The extent of such at least slight disengagement can be selected in dependency upon the filtered or processed signal values but the typical vibrations of the shifting lever should not be considered.

What is claimed is:

1. In a motor vehicle, a combination comprising:
   a driving unit;
   a transmission having a variable transmission ratio;
   means for selecting said transmission ratio, including an actuatable servicing element;
   an automated engageable and disengageable torque transmitting system;
   an actuatable load lever;
   actuatable brake means;
   a signal transmitting sensor arrangement including means for monitoring the condition of said servicing element, said load lever and said brake means; and a control unit arranged to receive signals from said sensor arrangement and to generate a control signal, in response to which said torque transmitting system is disengaged, when said servicing element is actuated simultaneously with said load lever and said brake means.

2. The structure of claim 1, wherein said torque transmitting system comprises a clutch.

3. The structure of claim 1, wherein said shifting element comprises a gear shifting member.

4. The structure of claim 1, wherein said load lever includes a gas pedal.

5. The structure of claim 1, wherein said brake means comprises at least one of a vehicle brake and a parking brake.

6. The structure of claim 1, wherein said brake means comprises an actuatable vehicle brake and an actuatable parking brake, said control unit being arranged to generate a control signal when said servicing element is actuated simultaneously with said load lever, said vehicle brake and said parking brake.

7. The structure of claim 1, wherein said transmission has a gear shifting gate including at least two sections in which different limit values are required for the ascertainment of a shifting intention.

8. The structure of claim 1, wherein said transmission has a gear shifting gate and the limit values which are utilized for a determination of a shifting intention vary as a function of time.

9. The structure of claim 1, wherein said transmission has a gear shifting gate and the values which are utilized or a determination of a shifting intention are altered upon reaching or exceeding of limit values.

10. The structure of claim 9, wherein said values are raised upon reaching or exceeding of limit values.

11. The structure of claim 9, wherein said values are lowered upon reaching or exceeding of limit values.

12. In a variable-speed motor vehicle, a combination comprising:
a driving unit;
a transmission having a variable transmission ratio;
means for selecting said transmission ratio, including an actuatable servicing element;
an automated engageable and disengageable torque transmitting system;
a signal transmitting sensor arrangement including means for monitoring the condition of said servicing element and the speed of the motor vehicle; and
a control unit arranged to receive signals from said sensor arrangement and to generate a control signal, in response to which said torque transmitting system is disengaged, when the speed of the motor vehicle is below a preselectable value in response to actuation of said servicing element.

13. The structure of claim 12, wherein said torque transmitting system includes a clutch.

14. The structure of claim 12, wherein said servicing element comprises a gear shifting member.

15. The structure of claim 12, wherein said preselectable value is between about 0 and 50 kilometers per hour.

16. The structure of claim 12, wherein said preselectable value is between about 0 and 30 kilometers per hour.

17. she structure of claim 12, wherein said preselectable value is between about 0 and 10 kilometers per hour.

18. The structure of claim 12, further comprising a load lever actuatable to influence the operation of said driving unit, said control unit being further arranged to generate said control signal in response to actuation of said load lever.

19. In a variable-speed motor vehicle, a combination comprising:
a variable torque-transmitting, variable-RPM engine;
actuatable vehicle and parking brakes;
a door having open and closed positions;
a pivotable throttle valve;
a transmission having a variable transmission ratio;
means for selecting said transmission ratio, including an actuatable servicing element;
an actuatable idling switch;
an automated engageable and disengageable torque transmitting system;
a load lever actuatable to a variable extent;
a signal transmitting sensor arrangement including means for monitoring the condition of said servicing element, said load lever, said brakes, said idling switch and said load lever, the position of said door, the speed of the vehicle, the engine torque, the extent of pivoting of said throttle valve, and the engine RPM; and
a control unit arranged to receive signals from said sensor arrangement and to generate a control signal, in response to which said torque transmitting system is disengaged, when said servicing element is actuated and in response to the fulfillment of at least one of the following prerequisites:
said idling switch is actuated,
said load lever is actuated to less than a predetermined extent,
said throttle valve is pivoted to less than a predetermined extent,
at least one of said brakes is actuated,
said door is open,
the speed of the motor vehicle is below a predetermined value,
the value of the gradient of engine torque, in the event of a negative gradient, exceeds a preselectable limit value,
the value of the gradient of the engine RPM, in the event of a negative gradient, exceeds a preselectable limit value, and
the value of the gradient of the vehicle speed, in the event of a negative gradient, exceeds a preselected limit value.

20. In a variable-speed motor vehicle, a combination comprising:
a varible torque-transmitting, variable-RPM engine;
actuatable vehicle and parking brakes;
a door having open and closed positions;
a pivotable throttle valve;
a transmission having a variable transmission ratio;
means for selecting said transmission ratio, including an actatable servicing element;
an actuatable idling switch;
an automated engageable and disengageable torque transmitting system;
a load lever actuatable to a variable extent;
a signal transmitting sensor arrangement including means for monitoring the condition of said servicing element, said load lever, said brakes, said idling switch and said load lever, the poisition of said door, the speed of the vehicle, the engine torque, the extent of pivoting of said throttle valve, and the engine RPM; and a control unit arranged to receive signals from said sensor arrangement and to generate a control signal, in response to which said torque transmitting system is disengaged, when said servicing element is actuated and after elapse of a predetermined interval of time, provided that said servicing element remains actuated during and after the elapse of said interval and in response to fulfillment of at least one of the following prerequisites:

said idling switch is actuated, said load lever is actuated to less than a predetermined extent, said throttle valve is pivoted to less than a predetermined extent, at least one of said brakes is actuated, said door is open, the speed of the motor vehicle is below a predetermined value, the value of the gradient of engine torque, in the event of a negative gradient, exceeds a preselectable limit value, the value of the gradient of the engine RPM, in the event of a negative gradient, exceeds a preselectable limit value, and the value of the gradient of the vehicle speed, in the event of a negative gradient, exceeds a preselected limit value.

* * * * *